(12) United States Patent
Wright et al.

(10) Patent No.: US 9,758,136 B2
(45) Date of Patent: Sep. 12, 2017

(54) INTEGRATED SYSTEM FOR A POWERED HANDBRAKE ON A LOCOMOTIVE

(71) Applicant: NEW YORK AIR BRAKE, LLC, Watertown, NY (US)

(72) Inventors: Eric C Wright, Evans Mills, NY (US); Jason Connell, Bethel Park, NY (US)

(73) Assignee: New York Air Brake, LLC, Watertown, NY (US)

( * ) Notice: Subject to any disclaimer, the term of this patent is extended or adjusted under 35 U.S.C. 154(b) by 15 days.

(21) Appl. No.: 14/596,620

(22) Filed: Jan. 14, 2015

(65) Prior Publication Data
US 2016/0200296 A1 Jul. 14, 2016

(51) Int. Cl.
| | | |
|---|---|---|
| *B60T 7/10* | (2006.01) | |
| *B61H 13/04* | (2006.01) | |
| *B60T 13/66* | (2006.01) | |
| *B60T 15/04* | (2006.01) | |
| *B60T 17/22* | (2006.01) | |

(52) U.S. Cl.
CPC .......... *B60T 7/107* (2013.01); *B60T 13/665* (2013.01); *B60T 15/048* (2013.01); *B60T 17/228* (2013.01); *B61H 13/04* (2013.01)

(58) Field of Classification Search
CPC . B60T 7/08; B60T 7/107; B60T 7/085; B60T 13/02; B60T 13/04; B60T 13/746; B60T 17/228; B60T 1/08; B60T 15/048; B60L 7/00; B60L 2250/24; B60L 2200/26; B61H 13/02; B61H 13/04; B61H 13/665
USPC ............. 303/3, 2, 13, 18, 22.6; 188/3 R, 33, 188/82.34, 82.7, 107, 144, 197, 198, 200, 188/210
See application file for complete search history.

(56) References Cited

U.S. PATENT DOCUMENTS

| | | | |
|---|---|---|---|
| 5,701,974 A | | 12/1997 | Kanjo et al. |
| 6,039,158 A | * | 3/2000 | Fox ........................... B60L 7/00 188/162 |
| 6,179,093 B1 | * | 1/2001 | Daugherty, Jr. ....... B61H 13/02 188/107 |

(Continued)

OTHER PUBLICATIONS

International Search Report Form PCT/ISA/220, International Application No. PCT/US2015/064885, pp. 1-12, dated Feb. 18, 2016.

*Primary Examiner* — Robert A Siconolfi
*Assistant Examiner* — San Aung
(74) *Attorney, Agent, or Firm* — Bond Schoeneck and King PLLC; David Nocilly

(57) ABSTRACT

A powered hand brake for locomotive brakes that latches a brake chain into a locked position after the brake cylinder has applied the locomotive brakes. A computer controlled brake system may be interconnected to the brake cylinder and the latch and programmed to set the latch into the latched position when the brake cylinder has moved the locomotive brake into the applied position. An actuator is coupled to the brake chain to take up slack in the brake chain as the brake chain moves between the first and second positions. The actuator can comprise a motor or a tensioning cylinder that takes up slack in the brake chain after the brakes have been applied. Alternatively, the actuator may comprise a linkage connecting the brake chain to the locomotive brake so that the slack in the brake chain is taken up as the brakes are applied.

14 Claims, 7 Drawing Sheets

(56) References Cited

U.S. PATENT DOCUMENTS

| | | | |
|---|---|---|---|
| 6,427,811 B1* | 8/2002 | Wedge | B60T 7/16 188/162 |
| 2002/0017439 A1* | 2/2002 | Hill | B60T 13/665 188/107 |
| 2003/0024774 A1* | 2/2003 | Huber, Jr. | B60T 13/24 188/33 |
| 2004/0150259 A1* | 8/2004 | Michel | B61H 13/04 303/2 |
| 2006/0016647 A1 | 1/2006 | Engle | |
| 2007/0131497 A1* | 6/2007 | Ginder | B60L 7/00 188/162 |
| 2012/0046811 A1 | 2/2012 | Murphy et al. | |
| 2013/0068570 A1* | 3/2013 | Wedge | B61H 1/00 188/57 |
| 2014/0332328 A1* | 11/2014 | Albert | B61H 13/04 188/107 |

\* cited by examiner

INTEGRATED SYSTEM FOR A POWERED HANDBRAKE ON A LOCOMOTIVE

BACKGROUND OF THE INVENTION

1. Field of the Invention

The present invention relates to locomotive braking systems and, more particularly, a powered handbrake integrated into a locomotive braking system.

2. Description of the Related Art

Locomotives generally have both a pneumatic brake system that is used when the locomotive is powered and operating, and a hand brake that is used when parking the locomotive. An application of the hand brake prevents a locomotive from rolling away if the air pressure in the brake cylinder leaks away, such as when the locomotive is parked for a long period of time. Because modern locomotives can weigh in excess of 400,000 pounds, a manually operated hand brake must generate a significant brake force to hold a locomotive on a grade. As a result, a manual application of a hand brake often requires substantial effort and achieving sufficient brake force is dependent on the strength and skill of the operator. In addition, a locomotive hand brake is located on outside the locomotive cab and accessed via the catwalk that extends along the locomotive. Operation of the hand brake can thus pose a safety risk, particularly during inclement weather.

In order to address these issues, powered hand brakes have been introduced. For example, U.S. Pat. No. 6,427,811 discloses a hand brake that requires a high-powered electric motor in combination with a complex and expensive gear train to develop the required output force. Systems such as this also require complex feedback methods to sense the output load and shut down the motor when the required force has been achieved. A failure of the feedback method can result in blown fuses, physical damage to the components, or insufficient brake force. As a result, there is a need for a powered handbrake that is operable from the cab of the locomotive and does not require a complex or fault prone design.

BRIEF SUMMARY OF THE INVENTION

The present invention comprises a powered hand brake for locomotive brakes that has a brake chain interconnected to the locomotive brakes for movement between a first position when the locomotive brakes are in the released position and a second position when the locomotive brakes are in the applied position. A latch is coupled to the brake chain so that it is moveable between a latched position, where movement of the brake chain is prevented, and a released position, where the brake chain is free to move, including for a prolonged period. A computer controlled brake system may be interconnected to the brake cylinder and the latch and programmed to set the latch into the latched position when the brake cylinder has moved the locomotive brake into the applied position. An actuator may be coupled to the brake chain to take up slack in the brake chain as the brake chain moves between the first and second positions. The actuator can comprise a motor or a tensioning cylinder interconnected to and driven by the computer controlled brake system to take up slack in the brake chain after the brakes have been applied. Alternatively, the actuator may comprise a linkage interconnecting the brake chain to the locomotive brake so that the slack in the brake chain is taken up as the brakes moves from the released position to the applied position. A sensor may be positioned to determine the load on the brake chain and provide a signal corresponding to the load to the computer controlled brake system. The computer controlled brake system may be programmed to provide a single interface that controls the brake cylinder and the latch to a positive train control system. A locomotive control system can be in communication with the computer controlled brake system and programmed to inhibit operation of the locomotive if the brake chain is latched.

The powered hand brake is used by pressurizing the locomotive brake cylinders to move the locomotive brakes from a released position to the applied or set position. Once the brakes are being set or have been set by the braking system, the powered hand brake is activated to take up slack in the brake chain. Once the brakes have been fully set by the existing braking system and the powered hand brake has taken up the necessary slack, the brake chain is then latched into position using an actuator to hold the locomotive brakes in the applied position.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
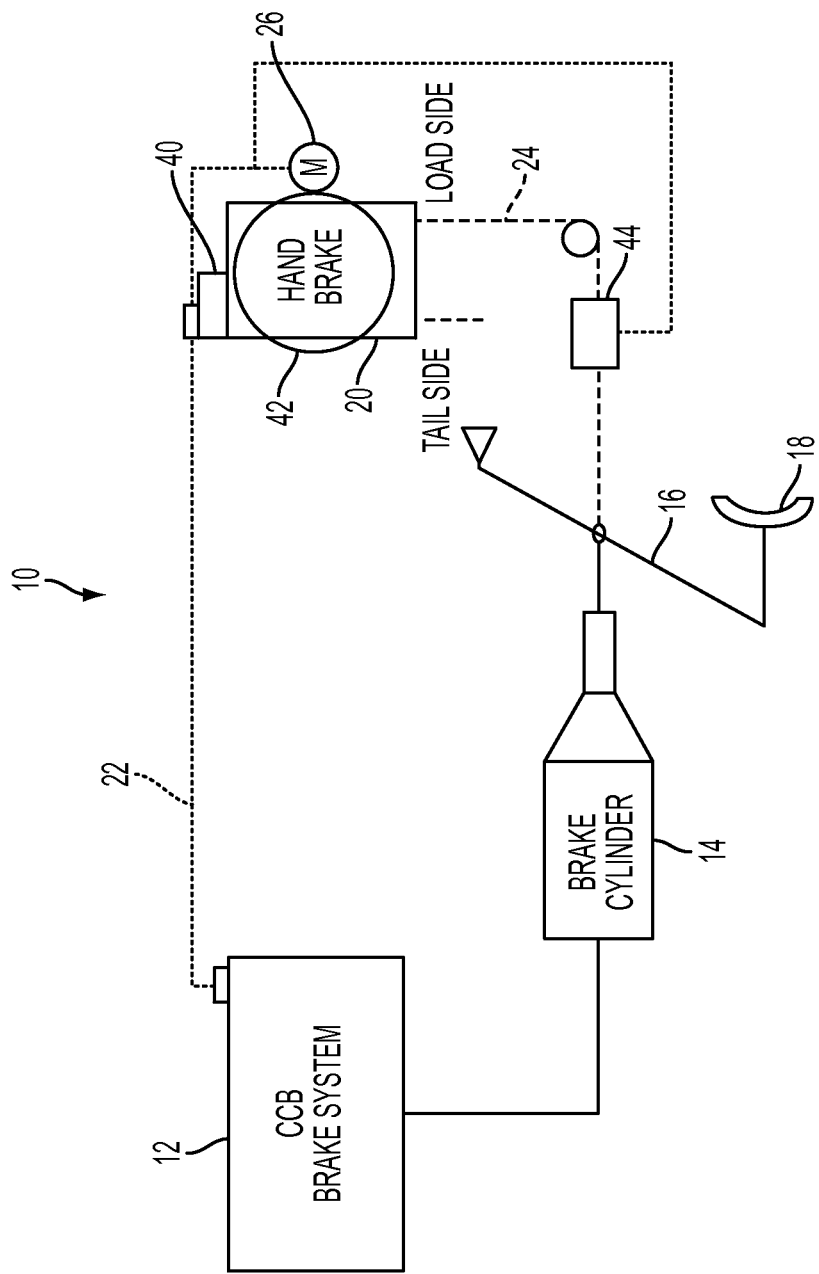
FIG. 1 is a schematic of a first example of powered hand brake system according to the present invention.

Referring now to the drawings, wherein like reference numerals refer to like parts throughout, there is seen in FIG. 1 a powered hand brake system 10 for a locomotive. Hand brake system 10 incorporates a computer controlled brake system 12 that is conventionally used to activate the pneumatic brake cylinder 14 of a locomotive braking system 16 to apply the locomotive brakes 18 by further adapting computer controlled brake system 12 as described herein. Those of skill in the art will appreciate that computer controlled brake system 12 includes a microcomputer that is programmable to operate the electro-pneumatic interface between the driver of the locomotive and the pneumatic parts of locomotive braking system 16 Computer controlled brake system 12 is also coupled to a hand brake 20 via a control line 22. Hand brake 20 is mechanically coupled to locomotive brakes 18, such as by a chain 24 that is taken up by hand brake 20 to maintain brakes 18 in an applied position and thus provide parking brake functionality. Thus, hand brake 20 is not used to set the brakes, but is instead used to maintain the brakes in the applied system in the event the pneumatic braking system releases pressure from brake cylinder 14.

Hand brake 20 is driven by a tensioning actuator 26, which may be an electronic, a pneumatic, or a hydraulic motor, that is in communication with control line 22 and responds to commands sent over control line 22 to drive hand brake 20 and thus take up chain 24. For example, actuator 26 may be a motor that is coupled to a drive gear of hand brake 20 to rotate the drive gear and take up brake chain 24. For example, a 74V DC starter motor from a large diesel motor that is similar to the starter used to start a diesel locomotive could be used. A motor such as this provides high torque in a small size, is easily controlled, rotates freely in either direction when de-energized, and can be powered by a locomotive battery. As brake cylinder 14 actually sets or applies the brakes, tensioning actuator 26 need only provide enough force to wind up slack in chain 24 so that the brakes will not release. It should be recognized, however, that there are numerous ways to pull chain 24 through hand brake 20 to provide the moderate tension required to maintain the brakes in the applied position. For example, a separate motor and winding drum may be connected to the tail of chain 24 or a pneumatic or hydraulic cylinder may be connected to the tail of the chain. In any case, a slip clutch may be provided between the motor and the hand brake gear to limit the maximum chain tension and limit the maximum drive torque of the motor. Alternatively, as motor current (or air pressure if a pneumatic motor is used) is proportional to motor torque, system 10 could monitor the current drawn by the motor and shut the motor off when the desired torque has been achieved.

Figure 2:
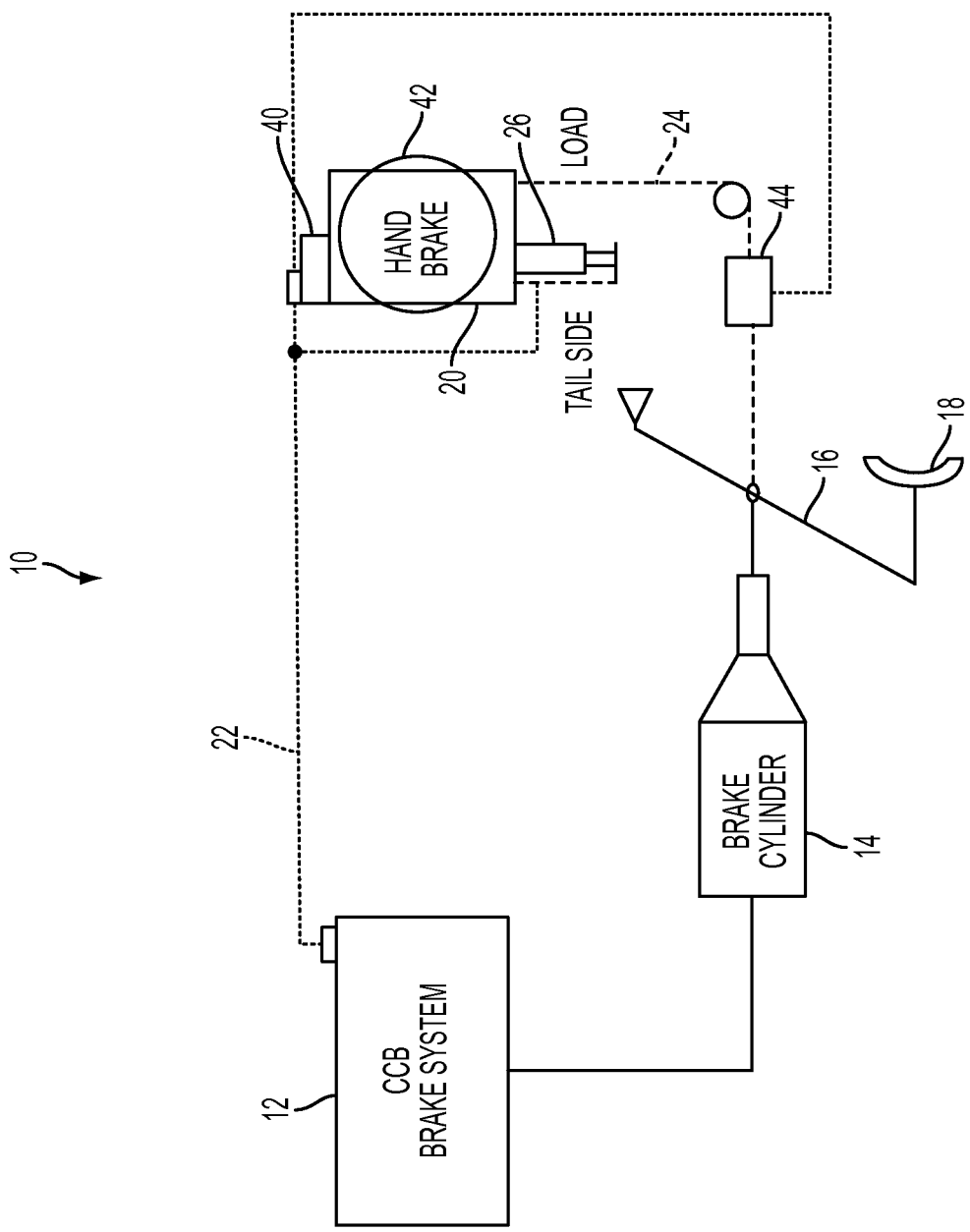
FIG. 2 is a schematic of a second example of powered hand brake system according to the present invention.

Alternatively, as seen in FIG. 2, actuator 26 may comprise a tensioning cylinder that can telescope longitudinally to take up chain 24 and apply brakes 18. Computer controlled brake system 12 may communicate with actuator 26 by providing actuator 26 with a network communications and control node. For example, a tensioning cylinder embodiment of actuator 26 could be driven pneumatically or hydraulically in response to commands sent by computer controlled brake system 12 over control line 22. In this embodiment, the computer controlled brake system 12 may be programmed to apply the locomotive pneumatic brakes, pressurize the tensioning cylinder 26 (during a parking brake set only) to pull chain 24 through hand brake 20, thus tensioning the chain, and then set latch 40 to hold the parking brake in the applied position. Once the parking brake is set, the locomotive pneumatic brakes and the pressure in the tensioning cylinder 26 may be released by computer controlled brake system 12 as latch 40 will hold the parking brake set. To release the parking brake, computer controlled brake system 12 may be programmed to re-pressurize locomotive pneumatic brakes, thereby reducing the tension on the parking brake chain, release the pressure from tensioning cylinder 26, release latch 40, and then release the locomotive pneumatic brakes. With both tensioning cylinder 26 and latch 40 released, the return spring of the locomotive brake cylinder can pull chain 24 through the hand brake 20 into the released state. Alternatively, tensioning cylinder 26 could be driven by a spring having a bias that is less than necessary to apply brakes 18 (so that brakes 18 are not applied by the spring of actuator 26), but sufficient to take up and retain any slack in chain 24 as brakes 18 are applied, thereby retaining brakes 18 in the applied position.

Figure 3:
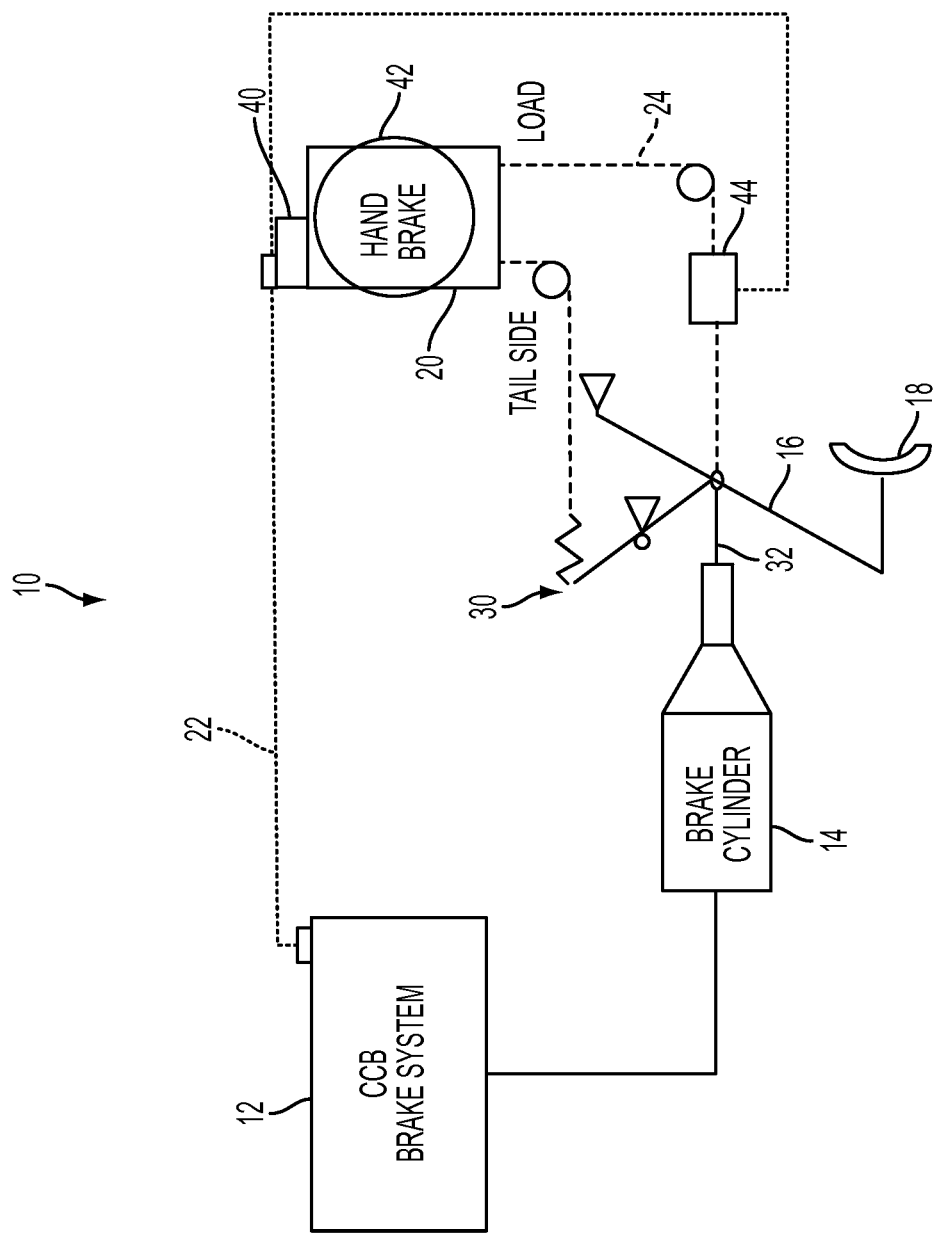
FIG. 3 is a schematic of a third example of powered hand brake system according to the present invention.
Figure 4:
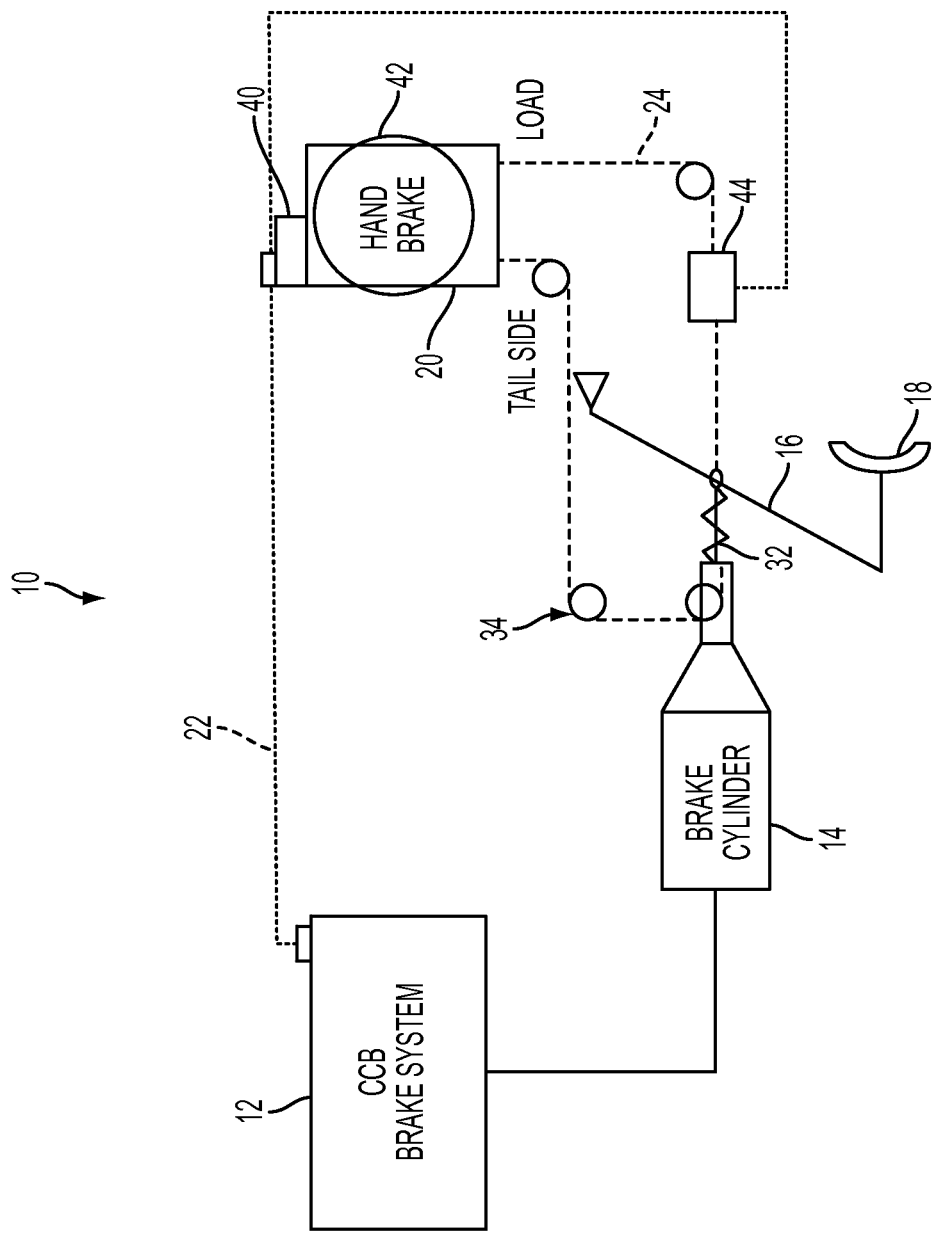
FIG. 4 is a schematic of a fourth example of powered hand brake system according to the present invention.

As seen in FIG. 3, actuator may comprise a mechanical reversing linkage 30 interconnecting chain 24 to the push rod 32 of brake cylinder 14 so that chain moves through hand brake 20 as brake cylinder 14 applies brakes 18. Similarly, as seen in FIG. 4, actuator 26 may comprise a series of reverser pulleys 34 that couple chain 24 directly to push rod 32 of brake cylinder 14 so that chain 24 moves through hand brake 20 with the application of brakes 18. In these embodiments, there is no need for computer controlled brake system 12 to signal a take up of slack in brake chain 24 as chain 24 will translate through hand brake 20 as brakes 18 are applied.

Hand brake 20 includes a hand brake latching device 40 interconnected to computer controlled brake system 12, such as via control line 22, for selectively engaging or disengaging from the winding drum in hand brake 20. Latching hand brake 20 against rotation prevents chain 24 from translating through hand brake 20 (a parking brake set mode) and unlatching allows chain 24 to translate through hand brake 20 (a parking brake released mode). In the embodiments seen in FIGS. 1-4, latching of brake chain 24 by latching device 40 when brakes are in the applied position will retain brakes 18 in the applied position as latching of brake chain 24 will prevent brakes 18 from returning to the released position, even if brake cylinder 14 is de-pressurized. Latching device 40 may comprise a solenoid, pneumatic or hydraulic cylinder, or other actuator that can selectively engage or disengage to retain or release brake chain 24.

Figure 5:
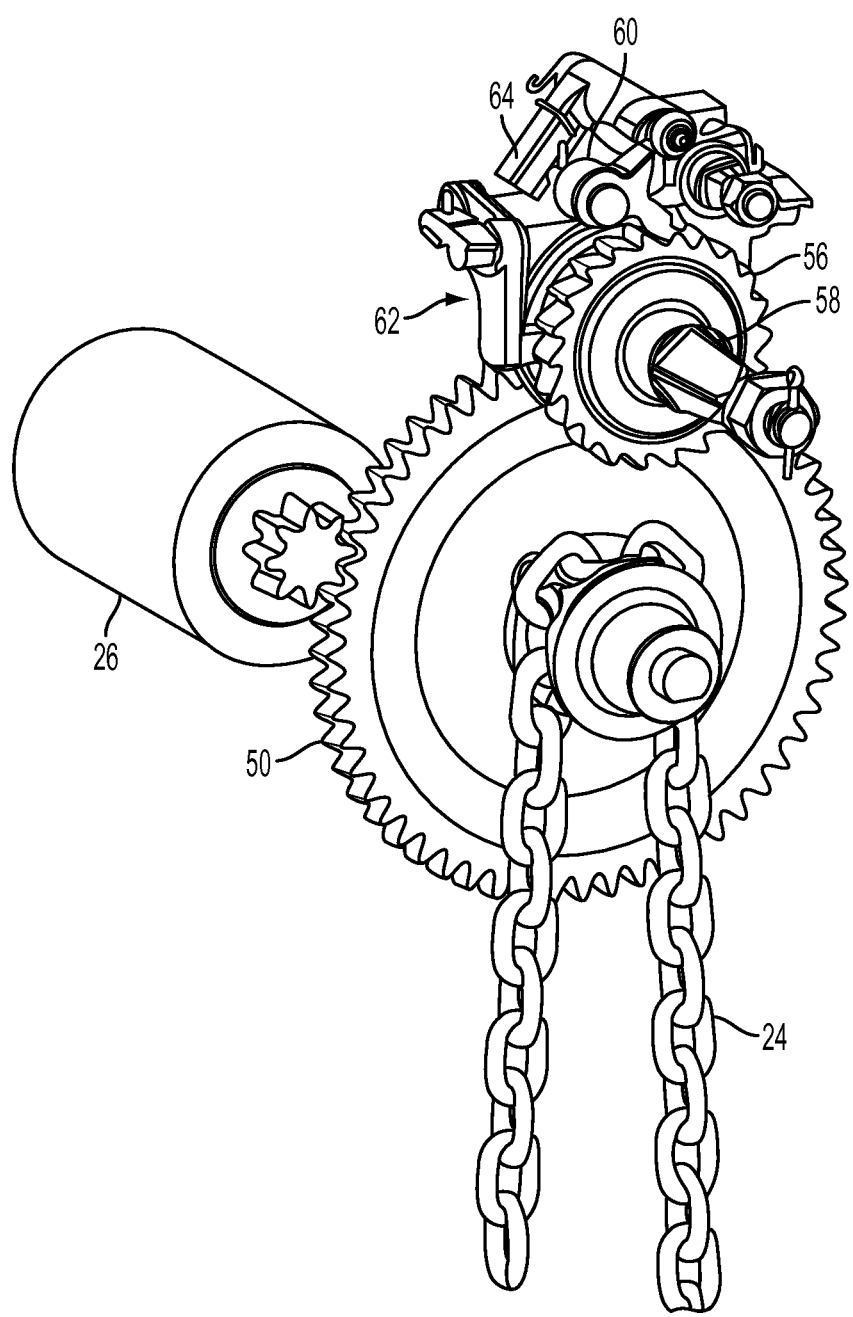
FIG. 5 is an isometric view of a powered hand brake system according to the present invention.
Figure 6:
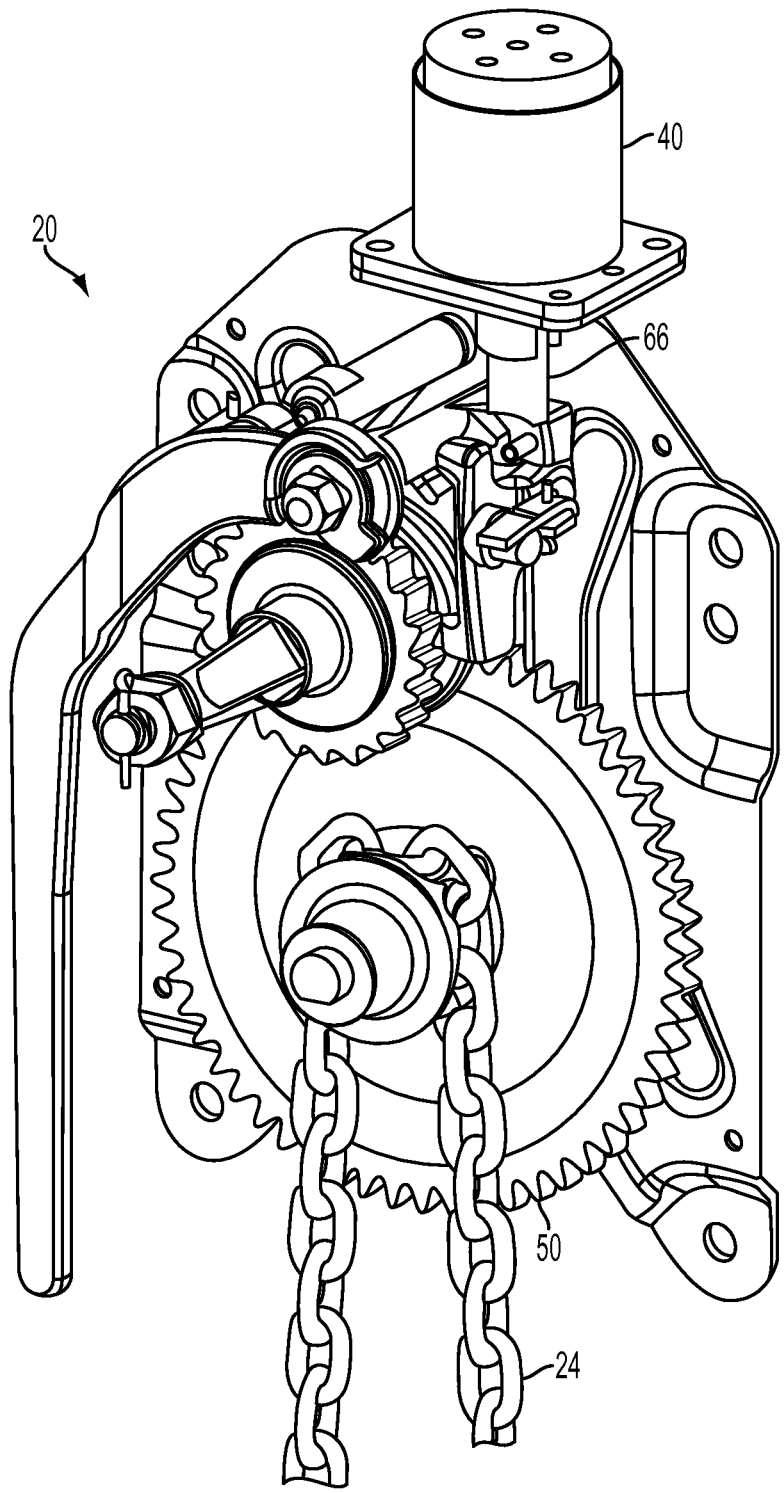
FIG. 6 is another an isometric view of a powered hand brake system according to the present invention.

Referring to FIG. 5, tensioning actuator 26 may be coupled to a drive gear 50 of hand brake 20 to rotate the drive gear and take up brake chain 24. Drive gear 50 is coupled to a drum 52 that, when rotated, will take up or let out chain 24. Hand brake 20 also includes a manual drive gear/ratchet 56 coupled to a hand wheel post 58 so that a user can manually drive drum 52 by turning a hand wheel 42 that is mounted onto post 58. A pawl 60 associated with drive gear/ratchet 56 prevents counter-rotation of drive gear/ratchet 56 and thus maintains hand brake 20 in an applied position after it has been applied. Hand brake 20 further includes a clutch mechanism 62 that allows manual drive gear/ratchet 56 and hand wheel 42 to be decoupled from drum 52, thereby releasing drum 52 to rotate and release chain 24. A prolonged release mechanism 64 may be used to retain clutch mechanism 62 in the declutched position so that drum 52 is free to rotate and hand brake 20 is not inadvertently applied if brake chain 24 has not fully unwound or if the motion of the rail car causes a loss of the slack in brake chain 24. Referring to FIG. 6, latching device 40 may latch and unlatch brake chain 24 by moving a post 66 either into or out of engagement with clutch mechanism 62, thereby controlling whether pawl 60 and drive gear 56 can prevent rotation of drum 52 so that chain 24 unwinds.

To set the parking brake, a locomotive operator can push a dedicated button or select the appropriate function on a display in a locomotive cab outfitted with computer controlled brake system 12. In response to such a command, computer controlled brake system 12 executes a pneumatic brake application of locomotive brakes 18 at a pressure calculated to provide the equivalent holding power of a properly set handbrake for that weight locomotive (plus a predetermined tolerance to compensate for pressure relaxation at the end of the parking brake cycle). Once brakes 18 are set to the appropriate pressure, computer controlled brake system 12 powers actuator 26 to remotely apply hand brake 20 and tension brake chain 24, and then set latching device 40. After hand brake 20 is set, computer controlled brake system 12 may optionally release the pressure in brake cylinder 14. Hand brake 20 will maintain the full parking brake force provided by brake cylinder 14, less a small amount due to relaxation as handbrake chain 24 and sheave wheel are fully loaded. As a result, the high forces required to apply hand brake 20 are provided by computer controlled brake system 12 via the pneumatic brake cylinder 14, which is already a necessary part of a locomotive braking system, thereby avoiding the need for complex and expensive driving mechanisms to apply the requisite force. Hand brake 20 is lightly tensioned using the low-power actuator 26 of hand brake 20, which need only provide enough power to moderately tension a slack hand brake chain 24, and finally set by latching device 40.

To release hand brake 20, a locomotive operator can push a dedicated button that selects a release function on a display associated with computer controlled brake system 12. Computer controlled brake system 12 is programmed to response by making a pneumatic brake application using brake cylinder 14 at about the same pressure that was previously used to set hand brake 20. Computer controlled brake system 12 then causes the release of hand brake 20 by unlatching of latching device 40, which allows hand brake chain 24 to go slack. By adjusting the release pressure in brake cylinder 14 to a predetermined amount less than the pressure used to make a hand brake application, system 10 can provide sufficient strain energy in hand brake chain 24 and brake rigging so that, upon release, chain 24 moves freely to a fully slack state. Nonetheless, the pneumatic brake application reduces the tension in hand brake chain 24, thereby reducing the power required to actuate latching device 40. With hand brake 20 in a release state, computer controlled brake system 12 exhausts the pressure in brake cylinder 14, thereby completing the parking brake release cycle. When hand brake 20 is in an unlatched state, hand brake chain 24 can be pulled through hand brake 20 in either direction. By using the power of a pneumatic brake application to both set/apply and release the locomotive brakes by pneumatically controlling brake cylinder 14, hand brake system 10 requires smaller, simpler, and less costly components. Although it would require a more powerful latching device 40 that optimal, system 10 may be configured to release hand brake 20 without first re-pressurizing brake cylinder 14.

The status of hand brake 20 may be determined by either an open loop or a closed loop mechanism. In an open loop approach, the application pressure and hand brake chain pre-tension would be configured in advance to provide the required parking brake force. A hand brake set and release status may then be stored in computer controlled brake system 12 based on the last command. Alternatively, hand brake 20 may include a sensor 44 that determines whether the brakes have loaded to a threshold high value, and thus in the applied state, or at a low/zero value, and thus released. Sensor 44 may comprise a load sensor in the load-side of hand brake chain 24 that outputs an electrical signal that is proportional to the tension in the load-side of chain 24. Sensor 44 may be interconnected to computer controller braking system 12, such as by line 22, so that the proportional electrical signal can be received by computer controller braking system 12. Alternatively, sensor 44 could be a load switch, which is open in one load state and closed in the other load state, for example. Sensor 44 may also be used to measure the hand brake force so that logic in computer controlled brake system 12 can compare that measurement to a threshold value representing an applied hand brake. The threshold value may be dynamically determined from the particular operating state of hand brake 20. The position/state of latching device 40 could also be read by computer controlled brake system 12 and correlated to the command state. Using any of these approaches, computer controlled brake system 12 can provide an indication to a train driver that hand brake 20 was set or released as commanded, and can provide a warning representing a system defect if the commanded state is not achieved by hand brake 20.

Figure 7:
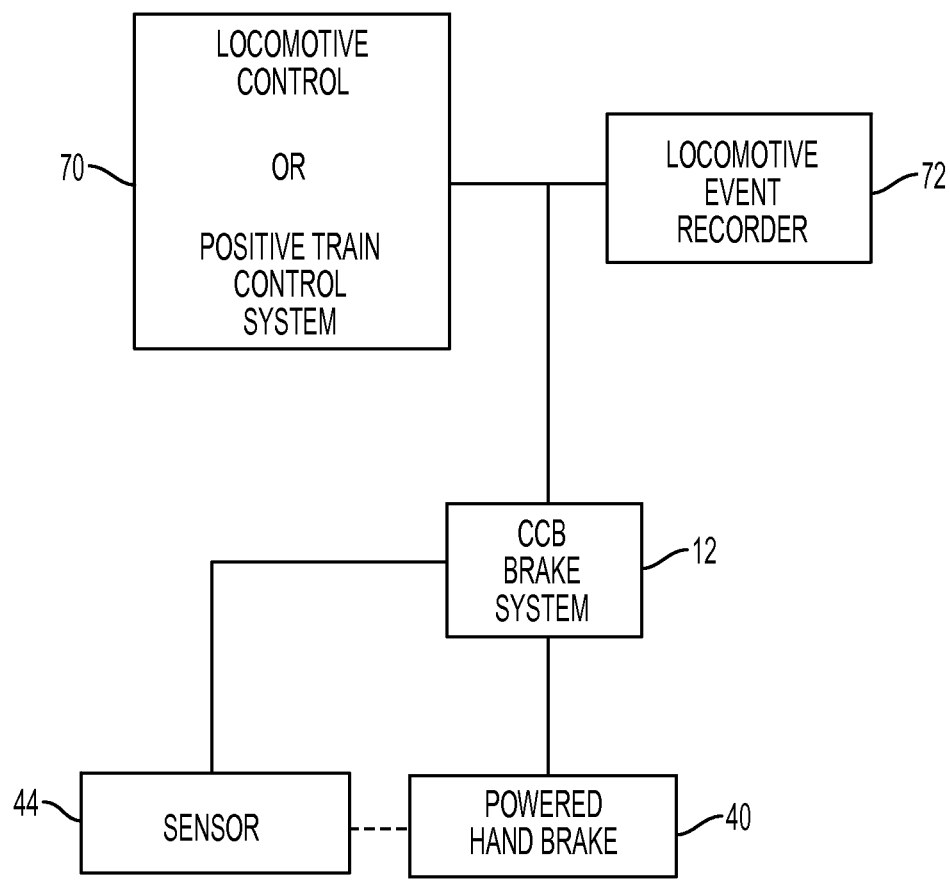
FIG. 7 is a perspective view a control system for a powered hand brake according to the present invention.

Referring to FIG. 7, powered hand brake 20, via computer controlled brake system 12, may be interconnected to a locomotive control computer 70 (or positive train control system) and/or a locomotive event recorder 72. As a result, status information provided by hand brake 20, such as information provided by sensor 44, can be used to trigger an operator notification or even an automatic interlock preventing an operator from driving the locomotive if hand brake 20 is applied. Computer controlled brake system 12 can further communicate hand brake 20 information to an event recorder 72 so that the state of hand brake 10 may be tracked over time. Integration of powered hand brake 20 with computer controlled brake system 12 also allows for a single interface where an operator can control both the pneumatic and parking brakes. For example, the use of sensor 44 in system 10 would allow for feedback with respect to whether hand brake 20 is in a commanded state and with respect to any change in the state of hand brake 40 if an application or release was made manually. A locomotive control system 70 on a lead locomotive also has the ability to communicate with and command operations on the trailing locomotives in a consist. Thus, a command from computer controlled brake system 12 to apply hand brake 20 can be transmitted to other locomotives from a lead locomotive control system 70 to the trailing locomotive control system 70, thereby allowing a single operator to apply powered hand brakes 20 on all of the locomotives in a consist. For example, intra-consist communications between lead locomotive control system 70 and any trailing locomotive control systems 70 can occur via a wired network bus, such as the Echelon PL22 used on ECP, over Ethernet, or even via a wireless communications network using any number of commercially available technologies. In like manner, in a train equipped with distributed power, for example a train having the LOCOTROL® (r) distributed power system available from by GE Transportation of Chicago, Ill., a command from computer controlled brake system 12 to apply hand brake 20 can be transmitted to other locomotives in a remote distributed power locomotive consist from a lead locomotive control system 70 to the remote locomotive control system 70, thereby allowing a single operator to apply powered hand brakes 20 on all of the locomotives in a consist.

What is claimed is:

1. A powered hand brake system for locomotive brakes, comprising:
    at least one brake cylinder that may be pressurized to move a locomotive brake from a released position to an applied position;
    a brake chain interconnected to the locomotive brake for movement between a first position when the locomotive brake is in the released position and a second position when the locomotive brake is in the applied position;
    a latch coupled to the brake chain that is moveable between a latched position, where the latch prevents movement of the brake chain, and a released position, where the latch does not prevent movement of the brake chain;
    an actuator coupled to the brake chain to take up slack in the brake chain as the locomotive brake is moved between the released position and the applied position by the brake cylinder; and
    a computer controlled brake system interconnected to the brake cylinder and the latch, wherein the computer controller brake system is programmed to set the latch into the latched position after the brake cylinder has moved the locomotive brake into the applied position and after the actuator has taken up slack in the brake chain.

2. The system of claim 1, wherein the actuator comprises a motor interconnected to and driven by the computer controlled brake system.

3. The system of claim 1, wherein the actuator comprises a tensioning cylinder interconnected to and driven by the computer controlled brake system.

4. The system of claim 1, wherein the actuator comprises a linkage interconnecting the brake chain to the locomotive brake so that the brake chain moves from the first position to the second position as the locomotive brake moves from the released position to the applied position.

5. The system of claim 1, wherein the actuator comprises pair of pulleys connecting the brake chain directly to the locomotive brake so that the brake chain moves from the first position to the second position as the locomotive brake moves from the released position to the applied position.

6. The system of claim 1, further comprising a sensor positioned to determine the load on the brake chain and provide a signal corresponding to the load to the computer controlled brake system.

7. The system of claim 1, wherein the computer controlled brake system is further programmed to provide a single interface that controls the brake cylinder and the latch to a positive train control system.

8. The system of claim 1, further comprising a locomotive control system in communication with the computer controlled brake system.

9. The system of claim 8, wherein the locomotive control system is programmed to inhibit operation of the locomotive if the brake chain is latched.

10. The system of claim 8, wherein the locomotive control system is programmed to provide an alert if the brake chain is latched and the locomotive control system received an input commanding movement of a locomotive.

11. The system of claim 1, further comprising a locomotive event recorder in communication with the computer controlled brake system and the computer controller brake system is programmed to report on the movement of the latch into the latched and released positions to the locomotive event recorder.

12. A method of powering the hand brake of a locomotive, comprising the steps of:
pressurizing a brake cylinder to move a locomotive brake from a released position to an applied position;
taking up the slack in a brake chain that is interconnected to the locomotive brake when the locomotive brake in the applied position;
latching the brake chain to prevent movement of the brake chain after the slack in the brake chain has been taken up.

13. The method of claim 12, further comprising the step of determining the status of the latching of the brake chain.

14. The method of claim 13, further comprising the step of inhibiting tractive power if the brake chain is latched.

* * * * *